Dec. 18, 1923.  
P. TODD  
1,478,189  
RESERVE SUPPLY DRAIN AND CUT-OFF VALVE FOR LIQUID FUEL TANKS  
Filed Aug. 7, 1922
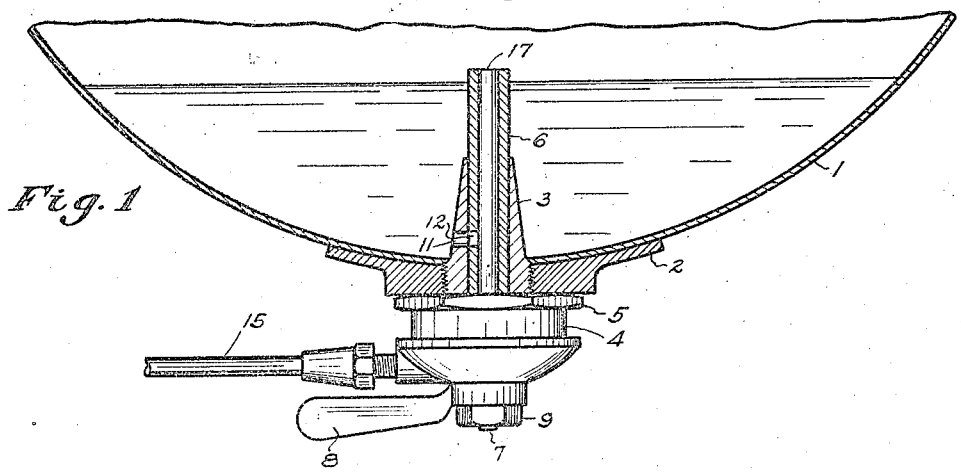
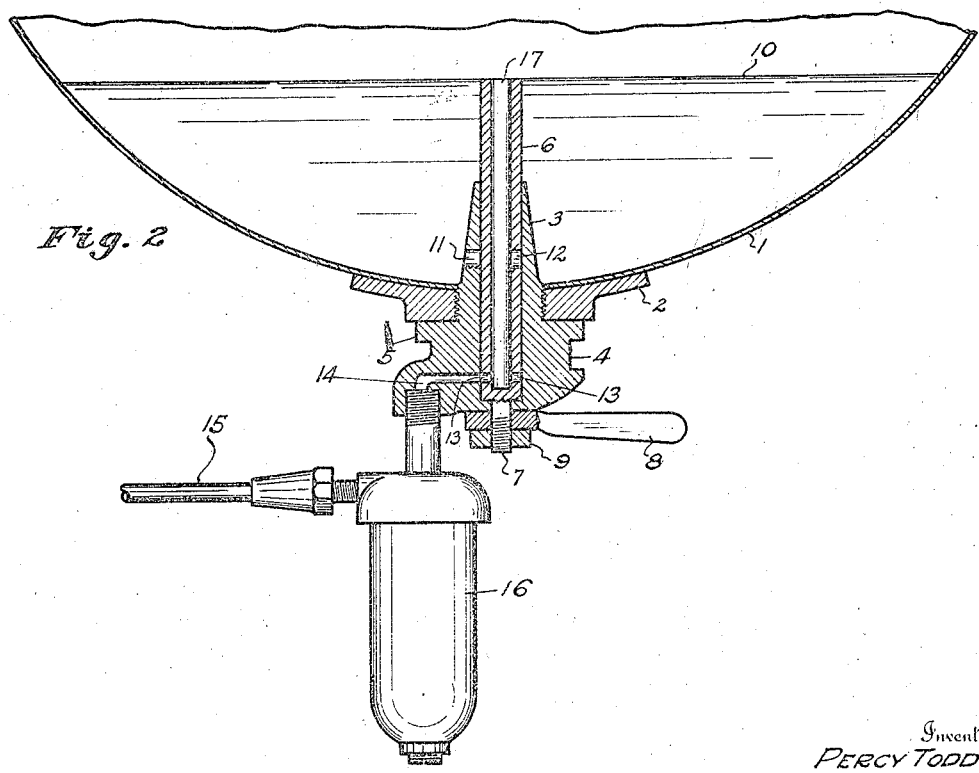
Inventor  
PERCY TODD.

Patented Dec. 18, 1923.

1,478,189

UNITED STATES PATENT OFFICE.

PERCY TODD, OF GADSDEN, ALABAMA.

RESERVE-SUPPLY DRAIN AND CUT-OFF VALVE FOR LIQUID-FUEL TANKS.

Application filed August 7, 1922. Serial No. 580,117.

*To all whom it may concern:*

Be it known that I, PERCY TODD, a subject of the King of Great Britain, residing at Gadsden, in the county of Etowah and State of Alabama, have invented certain new and useful Improvements in Reserve-Supply Drain and Cut-Off Valves for Liquid-Fuel Tanks, of which the following is a specification.

My invention relates to a reserve supply valve for fuel oil tanks and the like having for its chief object simplicity of design and ease of adaptation into service. This valve is designed to fit into the fuel tank of the less expensive cars also motorcycles and motor boats, without change in the tank connections, and to adapt the present tank to serve the purpose of an auxiliary tank. Its working parts are few and simple and its manufacture inexpensive while it is designed to serve the threefold purpose of supplying fuel to the engine yet withholding a reserve supply in the tank for emergency use; of draining the said reserve supply; and of serving as a cut-off valve at any time to prevent the further discharge of the fuel oil from the tank.

My invention moreover comprises the novel details of construction and arrangements of parts, which in their preferred embodiment only are illustrated in the accompanying drawings, to which reference is made in the following specification, and in which:—

Fig. 1 is a vertical elevation showing partially in cross section the valve tube and tank with the reserve supply drain open.

Fig. 2 is a vertical cross-section of a similar valve showing the usual filter properly connected therewith.

Similar reference numerals refer to similar parts throughout the drawings.

My invention, as illustrated, comprises a tank 1 with outlet collar 2 attached thereto. A bushing 3 cast integral with the body portion 4 of the valve, said body portion having a hex-shaped collar 5 cast thereon to permit screwing the bushing 3 into the tank bottom. Extending through the bushing 3 is a tube 6 closed at its lower end and formed into a threaded rod 7 at its lower end, whereupon the operating lever 8 is attached and keyed by any suitable means and secured by the lock nut 9. This tube 6 is of such length as to project upwardly into the tank far enough to prevent the complete discharge of the contents of the tank, i. e., to leave in the tank an emergency reserve up to the liquid level 10. At the base of the bushing 3 I provide a hole 11 which registers with the hole 12 in one side of the tube 6. At the lower end of the tube 6 are two oppositely disposed holes 13 lying in the same vertical plane as the hole 12 and in the same horizontal plane as the duct 14 which leads through the body 4 to the discharge line 15. In Fig. 2 I show by very little change in the valve design the interposition of a filter 16, which is so commonly used on the smaller cars, between the duct 14 and the line 15.

The operation of the above described valve is indeed simple. It is assumed that normally the fuel oil in the tank 1 will be kept above the level 10 and the tube 6 will be set as shown in Fig. 2, but, should the fuel run so low as to stop discharging from the tank through the open top orifice 17 of the tube 6 and cause the engine to stop, the operator will take heed that his fuel supply is low. Until this time the tube 6 acting as a valve will close the port 11, but this port can be now opened by bringing the hole 12 opposite the hole 11 and thereupon the remaining fuel constituting the emergency reserve will be discharged. It will be noted that in both of these positions one or the other of the holes 13 in the bottom of the tube 6 will register with the outlet duct 14. However the supply can be stopped entirely at any time by turning the lever in such position as to blank off the end of the duct 14 by throwing the holes 13 out of register therewith, thus my invention serves the threefold purpose of supply, reserve and cut off.

Having thus described my invention, what I claim as new and desire to secure by Letters Patent, is:—

1. In combination with a fuel tank having a bottom opening, a sleeve mounted in said opening and having a port therein disposed within the tank near its bottom, a drain tube mounted to rotate in and projecting upwardly through and above said sleeve to, and having an upper port at a predetermined level in the tank, there being an intermediate port in said tube adapted to register with said sleeve port, and a discharge duct in the sleeve, there being a pair of spaced lower ports in the tube adapted one at a time to register with said duct or to be moved out of register therewith and one lying in a vertical plane with said intermediate tube port.

2. A valve adapted to drain, cut off and hold an emergency reserve of fuel oil in a tank, comprising a sleeve entering the tank bottom and having intake and discharge ports, an integral tubular valve fitted to rotate in and projecting upwardly to a predetermined height through said sleeve and having an upper port at its top and an intermediate port disposed to register with the sleeve intake port and opposite lower ports lying in the same vertical plane with said intermediate port and disposed to register with the sleeve's discharge port as the valve is rotated, said lower ports being spaced to enable the valve to close said discharge port, and means to rotate said valve to operating positions connecting the outlet and intermediate ports, the outlet and top ports only, or closing the outlet port, as and for the purposes described.

In testimony whereof I affix my signature.

PERCY TODD.

Witness:
NOMIE WELSH.